United States Patent

Punja

[11] 3,897,557
[45] July 29, 1975

[54] CARBAMOYLOXYIMINO-AZOLIDINES AS INSECTICIDES

[75] Inventor: Nazim Punja, Wokingham, England

[73] Assignee: Imperial Chemical Industries Limited, London, England

[22] Filed: June 10, 1974

[21] Appl. No.: 478,043

Related U.S. Application Data

[62] Division of Ser. No. 250,119, May 4, 1972, Pat. No. 3,843,669.

[30] Foreign Application Priority Data
May 7, 1971 United Kingdom............. 13723/71

[52] U.S. Cl. ........... 424/270; 424/272; 424/DIG. 8; 424/263
[51] Int. Cl........ A01n 9/14; A01n 9/22; A01n 9/28
[58] Field of Search ...... 424/263, 270, 272, DIG. 8; 260/306.7

[56] References Cited
UNITED STATES PATENTS
3,681,479  8/1972  Gutman........................ 260/306.7

Primary Examiner—Jerome D. Goldberg
Assistant Examiner—Allen J. Robinson
Attorney, Agent, or Firm—Cushman, Darby & Cushman

[57] ABSTRACT

Compounds of the formula

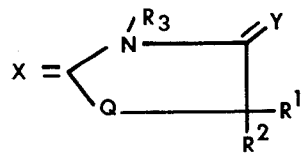

wherein Q is sulphur, sulphoxide, sulphone or oxygen; $R^1$ and $R^2$ which may be the same or different are hydrogen or alkyl containing up to four carbon atoms; $R^3$ is hydrogen, alkyl containing up to eight carbon atoms, allyl, benzyl, dimethylamino, methylthiomethyl, ethoxycarbonylmethyl, or halo-substituted pyridyl; and either (i) X is a group of the formula:

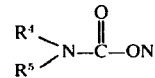

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and Y is oxygen, sulphur or alkylimino containing up to four carbon atoms; or (ii) Y is a group of the formula:

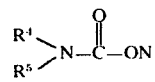

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and X is oxygen, sulphur or alkylimino containing up to four carbon atoms; useful as pesticides.

6 Claims, No Drawings

CARBAMOYLOXYIMINO-AZOLIDINES AS INSECTICIDES

This is a division of application Ser. No. 250,119 filed May 4, 1972 now U.S. Pat. 3,843,669 issued Oct. 22, 1974.

This invention relates to new organic compounds and processes for preparing them, to compositions comprising them, and to methods of combating pests using them. More particularly this invention relates to new carbamoyloxime derivatives and processes for preparing them, to pesticidal compositions comprising them, and to methods of combating insect and other invertebrate pests using them.

Accordingly, the present invention provides compounds of formula:-

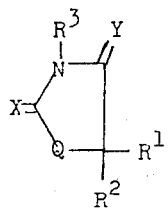

Wherein Q is oxygen or sulphur, or the sulphoxide or sulphone group; $R^1$, $R^2$ and $R^3$, which may be the same or different, are hydrogen, or unsubstituted, or substituted, hydrocarbyl or heterocyclic radicals; and either (i) X is a group of formula:

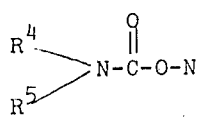

where $R^4$ and $R^5$, which may be the same or different, are hydrogen, or unsubstituted, or substituted, hydrocarbyl radicals, or the acyl residues of carboxylic or sulphur-containing acids; and Y is oxygen, sulphur or the hydrocarbylimino radical; or (ii) Y is a group of formula:-

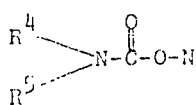

where $R^4$ and $R^5$, which may be the same or different, are hydrogen, or unsubstituted, or substituted, hydrocarbyl radicals, or the acyl residues of carboxylic or sulphur-containing acids; and X is oxygen, sulphur, or the hydrocarbylimino radical. In one aspect the invention also provides compounds of formula:-

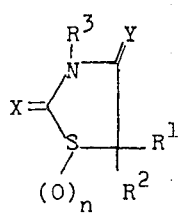

wherein $R^1$, $R^2$ and $R^3$ are hydrogen atoms or unsubstituted, or substituted, hydrocarbyl groups; n has the value zero, one or two; and wherein either (i) X is a group of formula:-

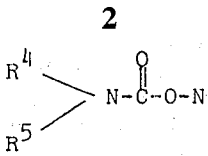

where $R^4$ and $R^5$ are hydrogen or hydrocarbyl groups, and Y is oxygen or sulphur or the hydrocarbylimino group; or (ii) Y is a group of the formula:-

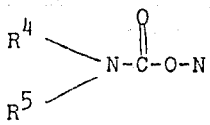

where $R^4$ and $R^5$ are hydrogen or hydrocarbyl groups, and X is oxygen or sulphur or the hydrocarbylimino group.

Preferred compounds are those provided by the invention of formula:-

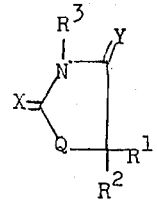

wherein Q is oxygen, or sulphur, or the sulphoxide or sulphone group; $R^1$ and $R^2$ which may be the same or different are hydrogen or alkyl; $R^3$ is hydrogen, alkyl, alkenyl, alkylthioalkyl, alkyl-substituted amino, aralkyl, ester-substituted alkyl, or a halo-substituted nitrogen-containing aromatic monocyclic heterocycle; and either (i) X is a group of formula:-

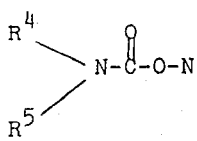

where $R^4$ and $R^5$, which may be the same or different, are hydrogen, alkyl, phenyl, halo-substituted phenyl, acyl, haloalkyl, alkoxyalkyl or alkylthioalkyl; and Y is oxygen, sulphur or alkylimino; or (ii) Y is a group of formula:-

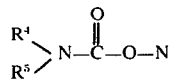

where $R^4$ and $R^5$, which may be the same or different, are hydrogen, alkyl, phenyl, halosubstituted phenyl, acyl, haloalkyl, alkoxyalkyl or alkylthioalkyl; and X is oxygen, sulphur or alkylimino.

In a more preferred aspect the invention provides compounds of formula:

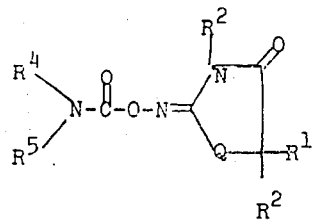

Wherein Q is an oxygen or sulphur atom, or the sulphoxide or sulphone group; $R^1$ and $R^2$, which may be the same or different are hydrogen or alkyl; $R^3$ is hydrogen, alkyl, alkenyl, alkylthioalkyl, alkyl-substituted amino, aralkyl, ester-substituted alkyl, or a halo-substituted nitrogen-containing aromatic monocyclic heterocycle; and $R^4$ and $R^5$ which may be the same or different, are hydrogen, alkyl, phenyl, halo-substituted phenyl, acyl, haloalkyl, alkoxyalkyl or alkylthioalkyl.

In an even more preferred aspect the invention provides compounds of formula:

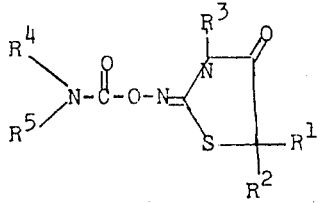

Wherein $R^1$ and $R^2$, which may be the same or different are hydrogen or alkyl; $R^3$ is hydrogen, alkyl, alkenyl, alkylthioalkyl, alkyl-substituted amino, aralkyl, ester-substituted alkyl, or a halo-substituted nitrogen-containing aromatic monocyclic heterocycle; and $R^4$ and $R^5$ which may be the same or different, are hydrogen, alkyl, phenyl, halo-substituted phenyl, acyl, haloalkyl, alkoxyalkyl or alkylthioalkyl.

In a even yet more preferred aspect the invention provides compounds of formula:-

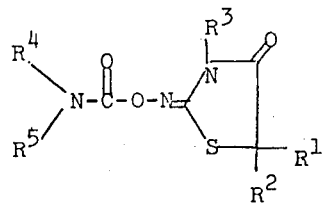

Wherein $R^1$ and $R^2$, which may be the same or different, are hydrogen, or alkyl containing up to four carbon atoms; $R^3$ is hydrogen, alkyl containing up to eight carbon atoms, allyl, benzyl, dimethylamino, methylthiomethyl, ethoxycarbonylmethyl, or halo-substituted pyridyl; and $R^4$ and $R^5$, which may be the same or different, are hydrogen, methyl, phenyl, chloro-substituted phenyl, acetyl, chloromethyl, methoxymethyl, ethoxymethyl or ethylthiomethyl.

Especially preferred compounds are those having the formula:-

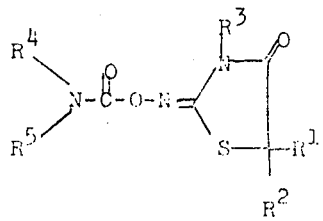

Wherein $R^3$ is alkyl containing up to four carbon atoms; $R^1$ and $R^2$ are hydrogen or alkyl containing up to four carbon atoms; $R^4$ is hydrogen or methyl; and $R^5$ is methyl.

Specific examples of compounds according to the formula:

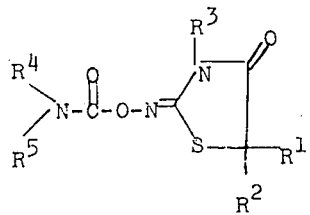

are set out in Table I below, where the meanings of $R^1$, $R^2$, $R^3$, $R^4$ and $R^5$ are given together with a melting point (m.p.) each compound expressed in degrees centigrade.

TABLE I

| Compound No: | $R^1$ | $R^2$ | $R^3$ | $R^4$ | $R^5$ | m.p. °C |
|---|---|---|---|---|---|---|
| 1 | H | H | $CH_2CH(CH_3)_2$ | $CH_3$ | H | 122 |
| 2 | H | H | $CH_3$ | $CH_3$ | H | 216 |
| 3 | H | H | $C_2H_5$ | $CH_3$ | H | 218 |
| 4 | $CH_3$ | $CH_3$ | $CH_3$ | $CH_3$ | H | 134.5 |
| 5 | H | H | n—$C_8H_{17}$ | $CH_3$ | H | 126 |
| 6 | H | H | n—$C_8H_{17}$ | $CH_3$ | $CH_3$ | 52 |
| 7 | $CH_3$ | $CH_3$ | $CH_3$ | $CH_3$ | $CH_3$ | 137 |
| 8 | $CH_3$ | $CH_3$ | H | $CH_3$ | H | 240 |
| 9 | $CH_3$ | H | $CH_3$ | $CH_3$ | H | 138 |
| 10 | $CH_3$ | $CH_3$ | $C_2H_5$ | $CH_3$ | H | 107 |
| 11 | H | H | $CH_3$ | $CH_3$ | $CH_3$ | 168 |
| 12 | $CH_3$ | $CH_3$ | $CH(CH_3)_2$ | $CH_3$ | H | 97 |
| 13 | $CH_3$ | $CH_3$ | $CH_2SCH_3$ | $CH_3$ | H | 106 |
| 14 | $CH_3$ | $CH_3$ | H | $CH_3$ | $COCH_3$ | 161 |
| 15 | $CH_3$ | $CH_3$ | $CH_2CH=CH_2$ | $CH_3$ | H | 76 |
| 16 | $CH_2CH(CH_3)_2$ | H | $CH_3$ | $CH_3$ | H | 130 |
| 17 | $C_2H_5$ | H | $CH_3$ | $CH_3$ | H | 105 |
| 18 | $CH_3$ | $CH_3$ | $CH_3$ | $C_6H_5$ | H | 98 |
| 19 | $CH(CH_3)_2$ | H | $CH_3$ | $CH_3$ | H | 120 |
| 20 | $C_2H_5$ | $C_2H_5$ | H | $CH_3$ | H | 162 |
| 21 | $CH_2CH(CH_3)_2$ | H | $C_2H_5$ | $CH_3$ | H | 100 |
| 22 | $C_2H_5$ | $C_2H_5$ | $CH_3$ | $CH_3$ | H | 104 |
| 23 | $CH_3$ | $CH_3$ | $N(CH_3)_2$ | $Ch_3$ | H | 118 |
| 24 | $CH(CH_3)_2$ | H | $C_2H_5$ | $CH_3$ | H | 91 |
| 25 | $C_2H_5$ | n—$C_4H_9$ | H | $CH_3$ | H | 145 |
| 26 | $C_2H_5$ | n—$C_2H_9$ | $CH_3$ | $CH_3$ | H | Oil |
| 27 | $CH_3$ | $CH_3$ | $CH_3$ | H | H | Sublimes at 300 |
| 28 | H | H | $CH_3$ | $C_6H_5$ | H | 140 |

TABLE I – Continued

| Compound No: | $R^1$ | $R^2$ | $R^3$ | $R^4$ | $R^5$ | m.p. °C |
|---|---|---|---|---|---|---|
| 29 | $CH_3$ | $CH_3$ | $CH_2C_6H_5$ | $CH_3$ | H | 120 |
| 30 | $CH_3$ | $CH_3$ | $CH_2CH(CH_3)_2$ | $CH_3$ | H | 103 |
| 31 | $CH_3$ | $CH_3$ | $CH_2COOC_2H_5$ | $CH_3$ | H | 112 |
| 32 | $CH_3$ | $C_2H_5$ | $CH_{16\ 3}$ | $CH_3$ | H | 80 |
| 33 | $CH_3$ | $CH_3$ | $CH_3$ | $CH_3$ | $CH_2Cl$ | 142 |
| 34 | $CH_3$ | $CH_3$ | $CH_3$ | $CH_3$ | $CH_2SC_2H_5$ | 74 |
| 35 | $CH_3$ | $CH_3$ | $CH_3$ | $CH_3$ | $CH_2OCH_3$ | 116 |
| 36 | $CH_3$ | $CH_3$ | $CH_3$ | $CH_3$ | $CH_2OC_2H_5$ | 68 |
| 37 | $CH_3$ | $CH_3$ | $CH_3$ | 2,6-dichlorophenyl | H | 143 |
| 38 | $CH_2CH(CH_3)_2$ | H | H | $CH_3$ | H | 130 |
| 39 | $CH(CH_3)_2$ | H | H | $CH_3$ | H | 120 |
| 40 | $C_2H_5$ | H | H | $CH_3$ | H | 105 |
| 41 | $CH_3$ | $CH_3$ | 3,5-dichloro-2,6-difluoro-4-pyridyl | $CH_3$ | H | 210 |
| 42 | $CH_3$ | $CH_3$ | $CH_2COC(CH_3)_3$ | $CH_3$ | H | 164 |

In another aspect the invention provides compounds of formula:-

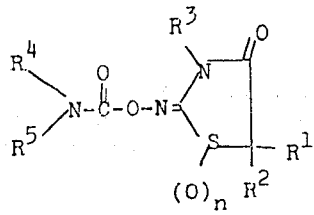

Wherein $R^1$, $R^2$ and $R^3$ are alkyl groups containing up to four carbon atoms; $R^4$ and $R^5$ are hydrogen or alkyl containing up to four carbon atoms, and n has the value one or two.

Specific compounds according to the formula:-

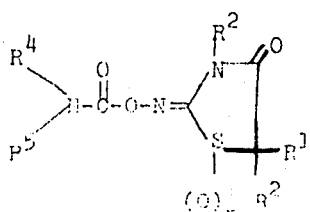

are set out in Table 2 below, where the meanings of $R^1$, $R^2$, $R^3$, $R^4$ and $R^5$ are given, together with the value of n and a melting point for each compound.

In another aspect the invention provides compounds of formula:-

Wherein $R^1$, $R^2$ and $R^3$ are alkyl groups containing up to four carbon atoms; $R^4$ and $R^5$ are hydrogen or alkyl groups comprising up to four carbon atoms; and Y is a sulphur atom or an alkylimino group containing up to four carbon atoms.

Specific compounds according to the formula:-

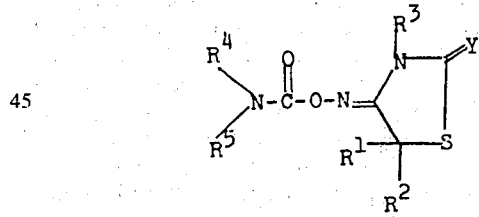

are set out in Table 3 below, where the meanings of Y, $R^1$, $R^2$, $R^3$, $R^4$ and $R^5$ are given together with a melting point for each compound.

TABLE 2

| Compound No. | $R^1$ | $R^2$ | $R^3$ | $R^4$ | $R^5$ | n | m.p.°C |
|---|---|---|---|---|---|---|---|
| 43 | $CH_3$ | $CH_3$ | $CH_3$ | $CH_3$ | H | 2 | 118 |
| 43A | $CH_3$ | $CH_3$ | $CH_3$ | $CH_3$ | H | 1 & 2 | Oil |

TABLE 3

| Compound No. | $R^1$ | $R^2$ | $R^3$ | $R^4$ | $R^5$ | Y | m.p.°C |
|---|---|---|---|---|---|---|---|
| 44 | $CH_3$ | $CH_3$ | $CH_3$ | H | $CH_3$ | S | 147 |
| 45 | $CH_3$ | $CH_3$ | $CH_3$ | $CH_3$ | $CH_3$ | S | 218 |
| 46 | $CH_3$ | $CH_3$ | $CH_3$ | $CH_3$ | H | $NC_4H_9$ | Oil |

In another aspect the invention provides compounds of formula:-

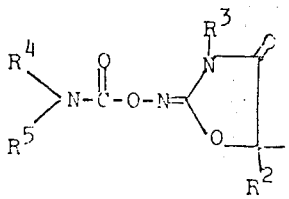

Wherein $R^1$, $R^2$ and $R^3$ are alkyl groups containing up to four carbon atoms; and $R^4$ and $R^5$ are hydrogen or alkyl groups containing up to four carbon atoms. A further specific compound of the present invention is that having the formula:-

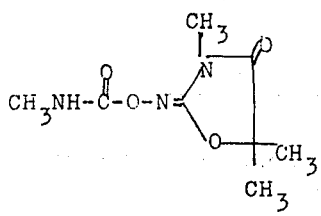

(Compound No. 47, m.p. 135°C)

The invention compounds may be prepared by treating an oxime of formula:

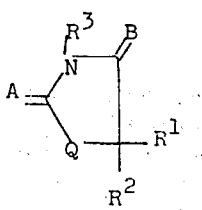

Wherein $R^1$, $R^2$, $R^3$ and Q have any of the meanings as defined hereinbefore and either (i) A is a group N-OH and B is oxygen, sulphur or a hydrocarbylimino group, or (ii) B is a group N-OH and A is oxygen sulphur or a hydrocarbylimino group, with a carbamoylating agent. Such agents include isocyanates, carbamoylhalides, and phosgene with ammonia or an amine.

Thus the invention provides a process for the preparation of compounds of the formula:

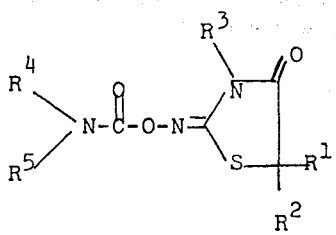

wherein $R^1$, $R^2$, $R^3$ and $R^5$ have any of the meanings as defined hereinbefore and wherein $R^4$ is hydrogen which comprises treating an oxime of formula:-

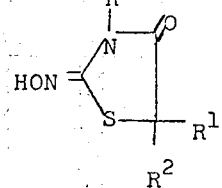

with an isocyanate of formula:-

$$R^5-N=C=O$$

The invention also provides a process for the preparation of a compound of the formula:-

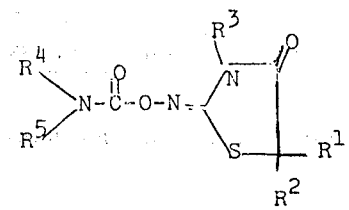

wherein $R^1$, $R^2$, $R^3$, $R^4$ and $R^5$ have any of the meanings as defined hereinbefore except that $R^4$ and $R^5$ cannot be hydrogen, which comprises treating an oxime of formula:-

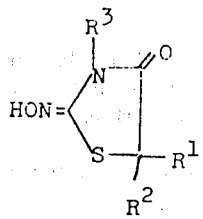

with a carbamoylhalide of the formula:-

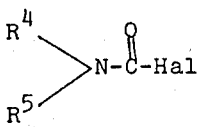

wherein Hal is a halogen atom, for example, a chlorine or bromine atom.

The invention also provides a process for the preparation of a compound of formula:-

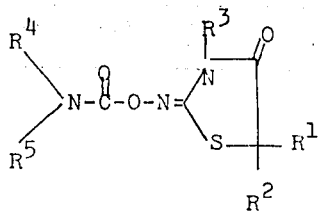

wherein R¹, R², R³, R⁴ and R⁵ have any of the meanings as defined hereinbefore, which comprises treating an oxime of formula:-

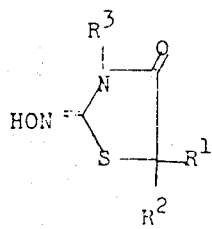

with phosgene and then bringing the product of such treatment into reaction with an amine of formula R⁴R⁵NH.

Such carbamoylation reactions are as outlined above are conveniently carried out in the presence of a base. Suitable bases include tertiary amines, for example triethylamine, or diethylaniline, aprotic nitrogen heterocycles for example pyridine or N-methylmorpholine, and alkali metal carbonates for example potassium carbonate. The reactions may also be carried out in the presence of a solvent or diluent, preferably a non-hydroxylic solvent, for example, chloroform, pyridine, aromatic hydrocarbons or petroleum ether.

Compounds of formula:

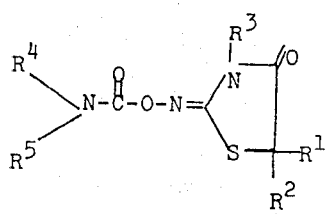

may also be prepared by the treatment of a compound of formula:

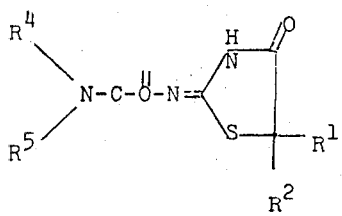

with a halogen compound of formula R³ Hal, conveniently in the presence of a base, for example sodium hydride. Compounds of formula:-

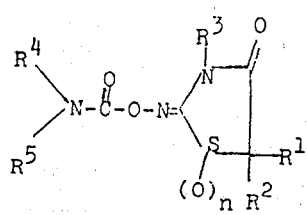

wherein R¹, R², R³, R⁴ and R⁵ have any of the meanings as defined hereinbefore and n has the value one or two may be prepared by the oxidation of a compound of formula:-

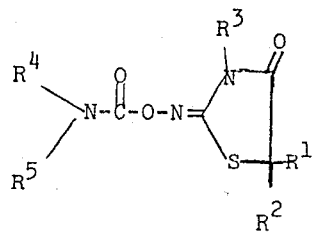

with an oxidising agent, for example, hydrogen peroxide in the presence of an acid, for example acetic acid. Compounds of formula:-

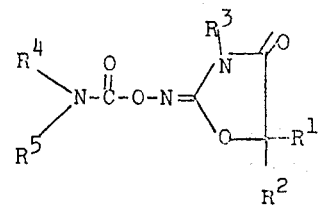

may be prepared by any of the carbamoylation procedures outlined above from an oxime of formula:-

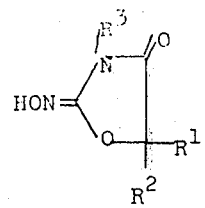

Invention compounds of formula:-

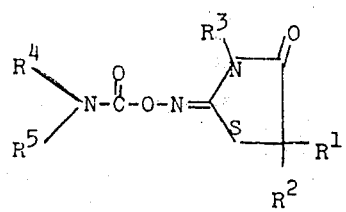

wherein R⁴ is an acyl group may be obtained by treating an invention compound of formula:-

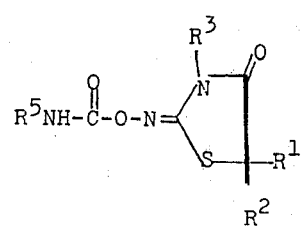

with an acylating agent, for example an acyl halide.
Invention compounds of formul:-

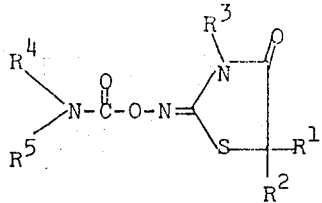

wherein R⁴ is a chloromethyl group may be obtained by treatment of a compound of formula:-

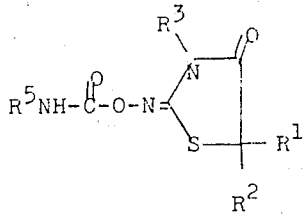

with formaldehyde and hydrogen chloride. Such chloromethylated compounds may be subsequently reacted with alcohols and thiols to yield invention compounds wherein R⁴ is alkoxyalkyl or alkylthioalkyl.

The oximes used as intermediates in the preparation of the invention compounds may be obtained by treatment of the corresponding thiones with hydroxylamines, thus for example a compound of formula:-

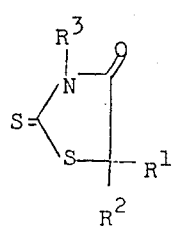 or 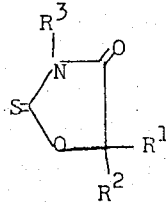

Wherein R¹, R² and R³ have any of the meanings as defined hereinbefore, may be treated with hydroxylamine to yield an oxime of formula:-

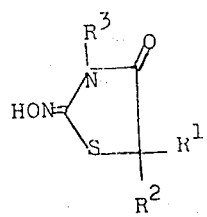 or 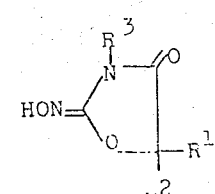

Similarly a compound of formula:-

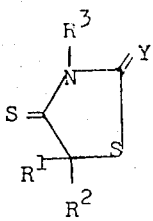

Where Y, R¹, R² and R³ have any of the meanings as defined hereinbefore, may be treated with hydroxylamine to give the oxime of formula:-

The thiones of formula:-

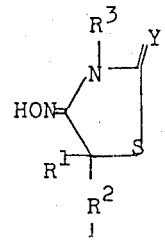

may be obtained by the well-known method of reacting together a compound of formula:-

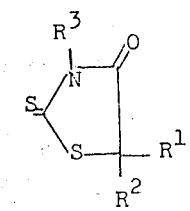

(usually in the form of a metal or ammonium salt thereof) with a haloacid of formula:-

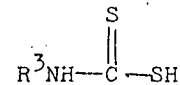

Where Hal is a halogen atom.

An alternative method of preparing the oximes of formula:-

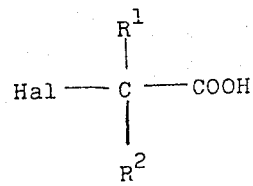

particularly those wherein R³ is hydrogen atom, involves the treatment of an imine of formula:-

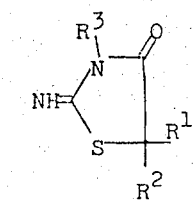

with hydroxylamine. Such imines may be obtained by the reaction of a thiourea of formula:-

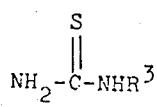

With a haloacid of formula:-

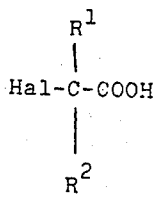

The thiones of formula:-

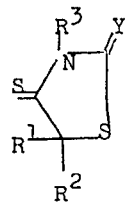

Where Y is sulphur may be obtained from the thiones of formula:

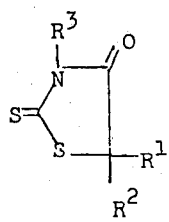

by treating the latter with phosphorus pentasulphide. If desired the thiones of formula:

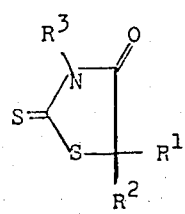

may first be treated with an amine to yield a compound of formula:

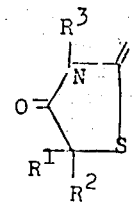

Where Y is hydrocarbylimino, before the treatment with phosphorus pentasulphide.

The compounds of this invention or compositions as hereinafter defined may be used to combat a variety of insect and other invertebrate pests including the following:

| | |
|---|---|
| Tetranychus telarius | (red spider mite) |
| Aphis fabae | (black aphid) |
| Aedes aegypti | (mosquito) |
| Megoura viciae | (green aphid) |
| Pieris brassicae | (white butterfly - larva) |
| Plutella maculipennis | (diamond back moth - larva) |
| Phaedon cochleariae | (mustard beetle) |
| Calandra granaria | (grain beetle) |
| Tribolium confusum | (flour beetle) |
| Musca domestica | (housefly) |
| Blattella germanica | (cockroach) |
| Agriolimax reticulatus | (grey field slug) |
| Meloidogyne incognita | (nematodes) |

A particularly useful feature of the activity of the invention compounds is their ability to act as systemic pesticides, that is to say, their ability to move through a plant to combat infestations thereon at a site remote from the site of application of the compound.

The compounds and compositions of this invention may also be used to control a variety of plant pathogens including the following fungal diseases of plants:

| | |
|---|---|
| Puccinia recondita | (rust on wheat) |
| Phytophthora infestans | (late blight on tomato) |
| Plasmopara viticola | (downy mildew on vine) |
| Podosphaera leucotricha | (powdery mildew on apple) |
| Uncinula necator | (powdery mildew on vine) |
| Piricularia oryzae | (blast on rice) |
| Botrytis cinerea | (grey mould on vine) |

Some of the compounds have algicidal properties. Compounds of the invention may also be used as herbicides, and are preferably used at higher rates of application for this purpose.

The compounds of the invention may be used to combat pests on their own but are more conveniently used in the form of a composition which comprises in addition to an invention compound, a diluent or carrier material.

In a further aspect therefore the invention provides a pesticidal composition comprising as an active ingredient a compound of formula:

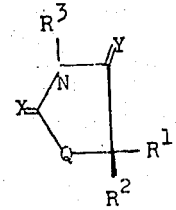

wherein Q is oxygen or sulphur, or the sulphoxide or sulphone group; $R^1$, $R^2$ and $R^3$, which may be the same or different, are hydrogen, or unsubstituted, or substituted, hydrocarbyl or heterocyclic radicals; and either (i) X is a group of formula:

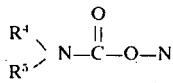

where $R^4$ and $R^5$, which may be the same or different, are hydrogen, or unsubstituted or substituted, hydrocarbyl radicals, or the acyl residues of carboxylic or sulphur-containing acids; and Y is oxygen, sulphur, or the hydrocarbylimino radical; or (ii) Y is a group of formula:-

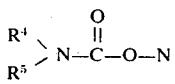

where $R^4$ and $R^5$, which may be the same or different, are hydrogen, or unsubstituted or substituted, hydrocarbyl radicals, or the acyl residues of carboxylic or sulphur-containing acids; and X is oxygen, sulphur, or the hydrocarbylimino radical.

In a preferred aspect the invention provides a pesticidal composition comprising as an active ingredient a compound of formula:-

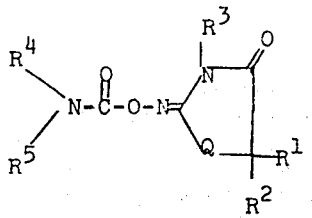

wherein Q is an oxygen or sulphur atom, or the sulphoxide or sulphone group; $R^1$ and $R^2$, which may be the same o different are hydrogen or alkyl; $R^3$ is hydrogen, alkyl, alkenyl, alkylthioalkyl, alkyl-substituted amino, aralkyl, alkylthioalkyl, alkyl-substituted amino, aralkyl, ester-substituted alkyl, or a halosubstituted nitrogen-containing aromatic monocyclic heterocycle; and $R^4$ and $R^5$ which may be the same or different, are hydrogen, alkyl, phenyl, halo-substituted phenyl, acyl, haloalkyl, alkoxyalkyl or alkylthioalkyl.

In a more preferred aspect the invention provides a pesticidal composition comprising as an active ingredient a compound of formula:-

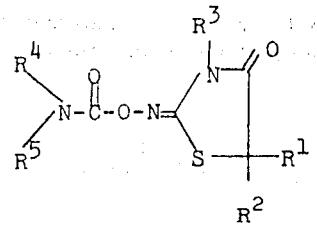

wherein $R^1$ and $R^2$, which may be the same or different are hydrogen or alkyl; $R^3$ is hydrogen, alkyl, alkenyl, alkylthioalkyl, alkyl-substituted amino, aralkyl, ester-substituted alkyl, or a halo-substituted nitrogen-containing aromatic monocyclic heterocycle; and $R^4$ and $R^5$, which may be the same or different, are hydrogen, alkyl, phenyl, halo-substituted phenyl, acyl, haloalkyl, or alkylthioalkyl.

In an even more preferred aspect the invention provides a pesticidal composition comprising as an active ingredient a compound of formula:

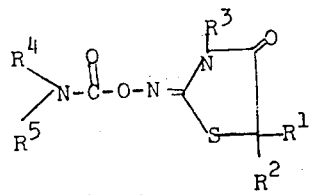

Wherein $R^3$ is alkyl containing up to four carbon atoms; $R^1$ and $R^2$ are hydrogen or alkyl containing up to four carbon atoms; $R^4$ is hydrogen or methyl; and $R^5$ is methyl.

In an especially preferred aspect the invention provides a pesticidal composition comprising as an active ingredient the compound having the formula:

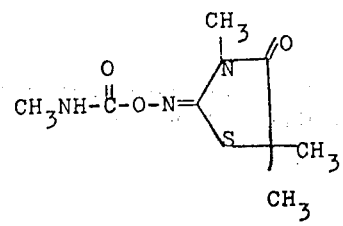

The compositions may be used for agricultural or horticultural purposes and the type of composition used in any instance will depend upon the particular purpose for which it is to be used.

The compositions may be in the form of dusting powders wherein the active ingredient is mixed with a solid diluent or carrier. Suitable solid diluents or carriers may be, for example, kaolin, bentonite, kieselguhr, dolomite, calcium carbonate, talc, powdered magnesium, Fuller's earth, gypsum, Hewitt's earth, diatomaceious earth and china clay.

The compositions may also be in the form of liquid preparations to be used as dips or sprays which are generally aqueous dispersion of emulsions containing the active ingredient in the presence of one or more wetting agents, dispersing agents, emulsifying agents or suspending agents.

Wetting agents, dispersing agents and emulsifying agents may be of the cationic, anion or non-ionic type. Suitable agents of the cationic type include, for example quaternary ammonium compounds, for example, cetyltrimethylammonium bromine. Suitable agents of the anionic type include, for example, soaps, salts of aliphatic mono-esters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropyl-naphthalene sulphonic acids. Suitable agents of the non-ionic type include, for example, the condensation products of ethylene oxide with fatty alcohols such as oleyl alcohol or cetyl alcohol or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives for example for improving the distribution, adhesive power and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrates to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may contain 10-85% by weight of the active ingredient or ingredients.

When diluted to form aqueous preparations, such preparations may contain varying amounts of the active ingredient or ingredients depending upon the purpose for which they are to be used.

For agricultural or horticultural purposes, an aqueous preparation containing between 0.0001% and 0.1% by weight of the active ingredient or ingredients may be used.

The compositions of the present invention may, if desired, also comprise in addition to a compound of the present invention, at least one other biologically active ingredient, for example, in insecticide, or a fungicide.

Thus, for example, a composition of the present invention may comprise a compound of the present invention together with the gamma isomer of 1,2,3,4,5,6-hexachlorocyclohexane.

In use, the invention compounds of compositions may be used to combat pests in a variety of ways. Thus the pests themselves, or the locus of the pests or the pest habitat may be treated to control the pests.

In a further feature therefore the invention provides a method of combating pests wherein the pests, the locus of the pests, or the habitat of the pests is treated with a compound or a composition according to the invention.

The invention also provides a method of treating plants with a compound of composition according to the invention to render them less susceptible to damage by pests, which may already be occurring (i.e. treatment to eradicate an infestation or infection) or which is expected to occur (i.e. treatment to protect the plant from an infestation or infection.

In a yet further feature, therefore, the invention provides a method of treating plants to render them less susceptible to damage by pests, which comprises treating the plants, or the seeds, corms, bulbs, tubers, rhizomes or other propagative parts of the plants, with a compound or composition according to the invention.

If desired the medium in which the plants are growing may be similarly treated with a compound or composition according to the invention.

In another feature, therefore the invention provides a method of treating a medium in which plants are growing or to be grown which comprises applying to the medium a compound or composition according to the invention.

The invention is illustrated, but not limited, by the following examples.

EXAMPLE 1

This example illustrates the preparation of 3,5,5-trimethyl thiazolidin-4-one-2-thione having the formula:

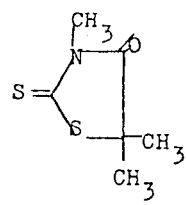

To a solution of methylamine in ethanol (33% w/v, 20 ml.) was added (40 ml.) and the mixture was cooled to 0°C, whilst carbon disulphide (7.6 g) in ethanol (10 ml.) was added with stirring over a period of 5 minutes. After stirring for a further 15 minutes ethyl 2-bromo-isobutyrate (19.4 g) was added over 5 minutes after which the mixture was refluxed for 3 hours. The mixture was then cooled and kept at the ambient temperature for 18 hours. After removal of the ethanol by evaporation under reduced pressure the residual solid was treated with water (100 ml), collected by filtration, washed with water and recrystallised from aqueous ethanol to give 3,5,5-trimethylthiazolidin-4-one-2-thione, melting at 96°C.

EXAMPLE 2

Compounds of formula:

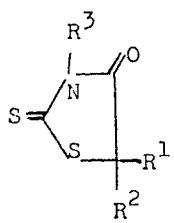

Wherein $R^1$, $R^2$ and $R^3$ have the meanings given in the Table below were prepared by a similar method to that illustrated in Example 1, using the appropriate reactants in each case. A physical characteristic is given for each compound.

| $R^1$ | $R^2$ | $R^3$ | Physical Characteristic |
|---|---|---|---|
| H | H | $CH_2CH(CH_3)_2$ | m.p. 115°C |
| H | H | $CH_3$ | m.p. 71–72°C |
| H | H | $C_2H_5$ | viscous Oil |
| H | $CH_3$ | $CH_3$ | b.p. 100°C/0.4 mm. |
| $C_2H_5$ | $C_2H_5$ | H | m.p. 106°C |
| $CH_3$ | $C_2H_5$ | $CH_3$ | m.p. 62°C |
| $CH_3$ | $CH_3$ | $N(CH_3)_2$ | m.p. 74°C |
| H | H | $n-C_8H_{17}$ | viscous Oil. |

EXAMPLE 3

This example illustrates the preparation of 5,5-dimethyl-2-imino-thiozolidin-4-one, having the formula:

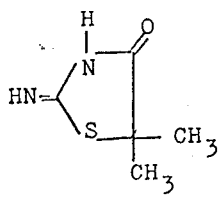

A mixture of thiourea (19.0 g) and ethanol (150 ml) was refluxed until all the thiourea had dissolved. Ethyl 2-bromo-iso-butyrate (49.0 g.) was then added over 10 minutes to the refluxing solution, after which the mixture was refluxed for 6 hours, kept at the ambient temperature for 18 hours and the ethanol removed by evaporation at reduced pressure. The residue was treated with water and then with aqueous sodium bicarbonate solution to adjust the pH to 7. The precipitated solid was collected by filtration, washed with water and dried to yield 5,5-dimethyl-2-imino-thiazolidin-4-one, melting at 258°C.

EXAMPLE 4

By a similar method to that illustrated in Example 3 the following compounds were also prepared: 2-iminothiazolidin-4-one, melting at 258°C; 5-ethyl-2iminothiazolidin-4-one, melting at 200°C; and 5-isopropyl-2-iminothiazolidin-4-one, melting at 231°C.

EXAMPLE 5

This example illustrates the preparation of 2-oximino-3,5,5-trimethylthiazolidin-4-one, having the formula:

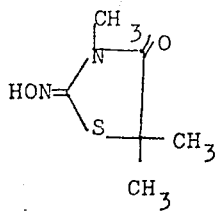

3,5,5-Trimethylthiazolidin-4-one-2-thione (62.0 g), hydroxylamine hydrochloride (75.0 g), pyridine (75.0 ml) and ethanol (750 ml) were refluxed together for 8 hours. The mixture was cooled and diluted with water. The precipitate was collected by filtration and recrystallised from a mixture of benzene and petroleum ether to yield 2-oximino-3,5,5-trimethyl-thiazolidin-4-one having a melting point of 216°C.

EXAMPLE 6

By a procedure similar to that illustrated in the preceeding example compounds of formula:

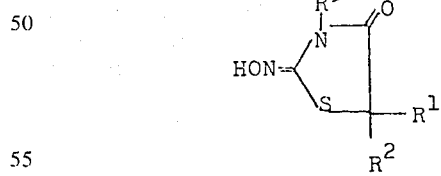

wherein the values of $R^1$, $R^2$ and $R^3$ are those set out in the following table, were also prepared. The table also includes a melting point in degrees centigrade for each compound.

| $R^1$ | $R^2$ | $R^3$ | m.p. °C |
|---|---|---|---|
| H | H | $CH_3$ | 221 |
| H | H | $C_2H_5$ | 218 |

-Continued

| R¹ | R² | R³ | m.p. °C |
|---|---|---|---|
| H | H | n—C₈H₁₇ | 162 |
| C₂H₅ | C₂H₅ | H | 166 |
| CH₃ | CH₃ | N(CH₃)₂ | 174 |
| CH₃ | C₂H₅ | CH₃ | 180 |

EXAMPLE 7

This example illustrates the preparation of 2-oximino-5,5-dimethyl-thiazolidin-4-one having the structure:

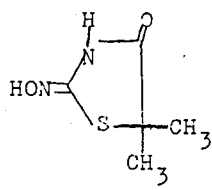

5,5-dimethylthiazolidin-2-imino-4-one (8.3 g), hydroxylamine hydrochloride (20.0g), pyridine (25.0 ml) and ethanol (150 ml) were mixed and refluxed for 2.5 hours, and kept at room temperature for 16 hours, after which the volatiles were removed under reduced pressure and the residue treated with water. The precipitate was collected by filtration and recrystallised from ethanol to give 2-oximino-5,5-dimethylthiazolidin-2-one, having the melting point of 204°C.

EXAMPLE 8

By the use of a procedure similar to that illustrated in the preceeding example the following compounds were also prepared. They all conform to the formula:

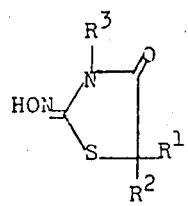

and the values for R¹, R² and R³, together with a melting point in degrees centigrade are set out in the table below.

| R¹ | R² | R³ | m.p. °C |
|---|---|---|---|
| CH₃— | CH₃ | H | 204 |
| H | CH₂CH(CH₃)₂ | H | 160 |
| H | C₂H₅ | H | 143 |
| H | CH(CH₃)₂ | H | 159 |
| C₄H₉ | C₂H₅ | H | 135 |
| H | CH₃ | CH₃ | 170 |

EXAMPLE 9

This example illustrates the preparation of 3,5,5-trimethyl-2-methyl-carbamoyloxyiminothiazolidin-4-one, (Compound No. 4, Table I) having the formula:

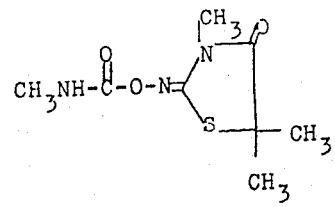

2-Oximino-3,5,5-trimethylthiazolidin-4-one (15.0 g) was suspended in chloroform and methyl isocyanate (5.0 g) added, together with triethylamine (4 drops). After keeping for 4 hours at room temperature the solvent was evaporated at reduced pressure and the residual solid recrystallised from benzene to yield 3,5,5-trimethyl-2-methylcarbamoyloxyiminothiazolidin-4-one, having a melting point of 134.5°C.

EXAMPLE 10

A similar procedure to that illustrated in the preceeding example was used for the preparation of the following compounds, using the appropriate intermediate oxime as follows:

3-isopropyl-2-methylcarbamoyloxyiminothiazolidin-4-one (Compound No. 1, Table I) from 3-isopropyl-2-oximinothiazolidin-4-one;

3-methyl-2-methylcarbamoyloxyiminothiazolidin-4-one (Compound No. 2, Table I) from 3-methyl-2-oximinothiazolidin-4-one;

3-ethyl-2-methylcarbamoyloxyiminothiazolidin-4-one (Compound No. 3, Table I) from 3-ethyl-2-oximinothiazolidin-4-one;

3-n-octyl-2-methylcarbamoyloxyiminothiazolidin-4-one (Compound No. 5, Table I) from 3-n-octyl-2-oximinothiazolidin-4-one;

3,5-dimethyl-2-methylcarbamoyloxyiminothiazolidin-4-one (Compound No. 9, Table I) from 3,5-dimethyl-2-oximinothiazolidin-4-one;

3-dimethylamino-5,5-dimethyl-2-methylcarbamoyloxyiminothiazolidin-4-one (Compound No. 23, Table I) from 3-dimethylamino-5,5-dimethyl-2-oximinothiazolidin-4-one; and 3,5-dimethyl-3; -ethyl-2-methylcarbamoyloxyiminothiazolidin-4-one (Compound No. 32, Table I) from 3,5-dimethyl-3-ethyl-2-oximinothiazolidin-4-one.

EXAMPLE 11

This example illustrates the preparation of 5,5-dimethyl-2-methylcarbamoyloxyiminothiazolidin-4-one (Compound No. 8, Table I) having the formula:

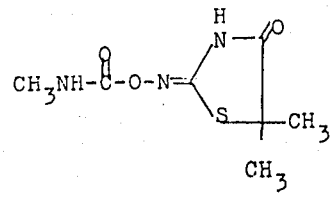

2-Oximino-5,5-dimethylthiazolidin-4-one (4.0 g), chloroform (150 ml), methyl isocyanate (2.0 ml) and triethylamine (3 drops) were mixed and kept at room temperature for 4 hours, after which the solvent was removed under reduced pressure. The residual solid was 5,5-dimethyl-2-methylcarbamoyl-oxyiminothiazolidin-4-one, melting at 240°C.

EXAMPLE 12

A similar procedure to that illustrated in the preceeding example was used to prepare the following compounds, using the appropriate oxime as follows: 5,5-diethyl-2-methylcarbamoyloxyiminothiazolidin-4-one; (Compound No. 20, Table I) from 5,5-diethyl-2-oximinothiazolidin-4-one. 5-n-butyl-5-ethyl-2-methylcarbamoyloxyiminothiazolidin-4-one (Compound No. 25, Table I) from 5-n-butyl-5-ethyl-2-oximinothiazolidin-4-one; 5-iso-butyl-2-methylcarbamoyloximinothiazolidin-4-one (Compound No. 38, Table I) from 5-iso-butyl-2-oximinothiazolidin-4-one; 5-iso-propyl-2-methylcarbamoyloxyiminothiazolidin-4-one (Compound No. 39, Table I) from 5-isopropyl-2-oximinothiazolidin-4-one; and 5-ethyl-2-methylcarbamoyloxyiminothiazolidin-4-one (Compound No. 40, Table I) from 5-ethyl-2-oximinothiazolidin-4-one.

EXAMPLE 13

This example illustrates the preparation of 3-n-octyl-2-dimethylcarbamoyloxyiminothiazolidin-4-one (Compound No. 6, Table I) having the formula:

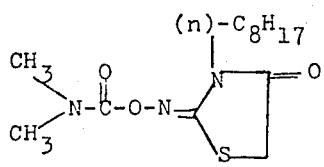

2-oximino-3-n-octylthiazolidin-4-one (4.5 g) was suspended in dry benzene (150 ml) and sodium hydride (1.0g of 50 percent dispersion in mineral oil) added in small portions at room temperature. After the initial effervescence had ceased the mixture was refluxed for 30 minutes and then cooled. Dimethylcarbamoyl chloride (2.2 g) was then added and the mixture again refluxed for 60 minutes, after which the mixture was cooled, poured into water, the benzene layer separated, washed with water, and dried over anhydrous magnesium sulphate. After filtration the filtrate was evaporated under reduced pressure and the residual solid recrystallised from petroleum ether to yield 3-n-octyl-2-dimethylcarbamoyloxyiminothiazolidin-4-one having a melting point of 52°C.

EXAMPLE 14

By a procedure similar to that illustrated in the preceeding example the following compounds were also prepared from the appropriate oximes:

3,5,5-trimethyl-2-dimethylcarbamoyloxyiminothiazolidin-4-one (Compound No. 7, Table I) from 3,3,5-trimethyl-2-oximinothiazolidin-4-one; and
3-methyl-2-dimethylcarbamoyloxyiminothiazolidin-4-one (Compound No. 11, Table I) from 3-methyl-2-oximinothiazolidin-4-one.

EXAMPLE 15

This example illustrates the preparation of 3,3,5-trimethyl-2-methylcarbamoyloxyiminothiazolidin-4-one (Compound No. 4, Table I) having the formula:

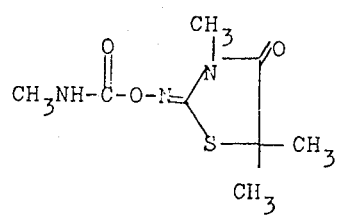

Sodium hydride (0.05 g) was added to 5,5-dimethyl-2-methylcarbamoyloxyiminothiazolidin-4-one (Compound No. 8, Table I; 0.49 g) in dimethylformamide (25 ml). Hydrogen was evolved over a period of about 5 minutes after which the mixture was gently warmed for 10 minutes. Methyl iodide (2 c.c.) was added and the mixture gently warmed for a further 15 minutes, after which it was cooled, poured into water and extracted with chloroform. The chloroform extract was washed with water and dried over anhydrous magnesium sulphate. After filtration the filtrate was evaporated at reduced pressure and the resultant oil triturated with n-hexane to yield 3,5,5-trimethyl-2-methylcarbamoyloxyiminothiazolidin-4-one, identical with the product obtained by the method of Example 9.

EXAMPLE 16

By a procedure similar to that illustrated in the proceeding example there were prepared other invention compounds from the appropriate reactants as follows:
3-ethyl-5,5-dimethyl-2-methylcarbamoyloxyimino-thiazolidin-4-one (Compound No. 10, Table I) from 5,5-dimethyl-2-methylcarbamoyloxyiminothiazolidin-4-one (Compound No. 8, Table I) and ethyl iodide;
3-iso-propyl-5,5-dimethyl-2-methylcarbamoylox-yiminothiazolidin-4-one (Compound No. 12, Table I) from 5,5-dimethyl-2-methylcarbamoyloxyimino-thiazolidin-4-one (Compound No. 8, Table I) and isopropylbromide;
3-methylthiomethyl-5,5-dimethyl-2-methylcarbamoyloxyiminothiazolidin-4-one (Compound No. 13, Table I) from 5,5-dimethyl-2-methylcarbamoyloxyiminotrhiazolidin-4-one (Compound No. 8, Table I and methyl chloromethyl thioether;
3-allyl-5,5-dimethyl-2-methylcarbamyloxyimino-thiazolidin-4-one (Compound No. 15, Table I) from 5,5-dimethyl-2-methylcarbamoyloxyiminothiazolidin-4-one (Compound No. 8, Table I) and allyl bromide;

3-methyl-5-iso-propyl-2-methylcarbamoyloxyiminothiazolidin-4-one (Compound No. 16, Table I) from 5-iso-propyl-2-methylcarbamoyloxyiminothiazolidin-4-one, (Compound No. 38, Table I) and methyl iodide;

3-methyl-5-ethyl-2-methylcarbanoyloxyiminothiazolidin-4-one (Compound No. 17, Table I) from 5-ethyl-2-methylcarbamoyloxyiminothiazolidin-4-one (Compound No. 40, Table I) and methyl iodide;

3-methyl-5-iso-propyl-2-methylcarbamoyloxyiminothiazolidin-4-one (Compound No. 19, Table I) from 5-iso-propyl-2-methylcarbamoyloxyiminothiazolidin-4-one (Compound No. 39, Table I) and methyl iodide;

3-ethyl-5-iso-butyl-2-methylcarbamoyloxyiminothiazolidin-4-one (Compound No. 21, Table I) from 5-iso-butyl-2-methylcarbamoyloxyiminothiazolidin-4-one (Compound No. 38, Table I) and ethyl iodide;

3-methyl-5,5-diethyl-2-methylcarbamoyloxyiminothiazolidin-4-one (Compound No. 22, Table I) from 5,5-diethyl-2-methylcarbamoyloximinothiazolidin-4-one (Compound No. 20, Table I) and methyl iodide;

3-ethyl-5-iso-propyl-2-methylcarbamoyloxyiminothiazolidin-4-one (compound No. 24, Table I) from 5-iso-propyl-2-methylcarbamoyloxyiminothiazolidin-4-one (Compound No. 39, Table I) and ethyl iodide;

3-methyl-5-n-butyl-5-ethyl-2-methylcarbamoyloxyiminothiazolidin-4-one (Compound No. 26, Table I) from 5-n-butyl-5-ethyl-2-methylcarbamoyloxyiminothiazolidin-4-one (Compound No. 25, Table I) and methyl iodide;

3-benzyl-5,5-dimethyl-2-methylcarbamoyloxyiminothiazolidin-4-one (Compound No. 29, Table I) from 5,5-dimethyl-2-methylcarbamoyloxyiminothiazolidin-4-one (Compound No. 8 Table I) and benzyl chloride;

3-iso-butyl-5,5-dimethyl-2-methylcarbamoyloxyiminothiazolidin-4-one (Compound No. 30, Table I) from 5,5-dimethyl-2-methylcarbamoyloxyiminothiazolidin-4-one (Compound No. 8, Table I) and iso-butyl bromide;

3-ethoxycarbonylmethyl-5,5-dimethyl-2-methylcarbamoyloxyiminothiazolidin-4-one (Compound No. 31, Table I) from 5,5-dimethyl-2-methylcarbamoyloxyiminothiazolidin-4-one (Compound No. 8 Table I) and ethyl chloroacetate;

3(2,5-dichloro-2,6-difluoropyrid-4-yl)-5,5-dimethyl-2-methylcarbamoyloxyiminothiazolidin-4-one (Compound No. 41 Table I) from 5,5-dimethyl-2-methylcarbamoyloxyiminothiazolidin-4-one (Compound No. 8 Table I) and 3,5-dichloro-2,4,6-trifluoropyridine; and 3-pivaloylmethyl-5,5-dimethyl-2-methylcarbamoyloxyiminothiazolidin-4-one (Compound No. 42, Table I) from 5,5-dimethyl-2-methylcarbamoyloxyiminothiazolidin-4-one (Compound No. 8 Table I) and chloromethyl t-butyl ketone.

EXAMPLE 17

This example illustrates the preparation 3,5,5-trimethyl-2(N-chloromethyl-N-methylcarbamoyl)oxyiminothiazolidin-4-one (Compound No. 33, Table I) having the formula:

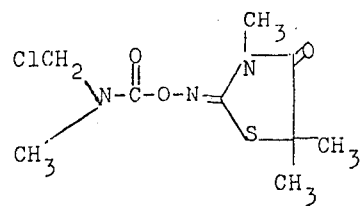

To a solution of 3,5,5-trimethyl-2-methylcarbamoyloxyiminothiazolidin-4-one (15.6 g) in methylene dichloride (100 ml) paraformaldehyde (16.0 g) was added. The mixture was cooled to 0°C and concentrated hydrochloric acid (specific gravity 1.19, 30 ml.) added with stirring at external cooling. Hydrogen chloride gas was passed into the mixture for one hour whilst the mixture temperature was kept at 0°C.

The methylene chloride layer was separated, dried over anhydrous magnesium sulphate and evaporated to yield 3,5,5-trimethyl-2(N-chloromethyl-N-methylcarbamoyl)-oxyiminothiazolidin-4-one, melting at 142°C.

EXAMPLE 18

This example illustrates the preparation of 3,5,5-trimethyl-2(N-ethylthiomethyl-N-methylcarbamoyl)oxyiminothiazolidin-4-one (Compound No. 34 Table I) having the formula:

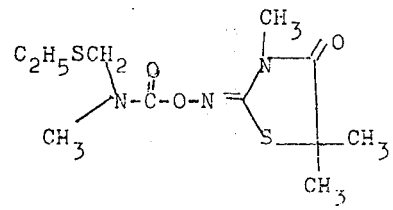

Ethane thiol (0.62 g) was added to a solution of sodium (0.23 g) in ethanol (25.0 ml) and to the stirred mixture was added a solution of 3,5,5-trimethyl-2(N-chloromethyl-N-methylcarbamoyl)oxyiminothiazolidin-4-one (2.7 g.) in ethanol (25.0 ml) at the ambient temperature. After keeping at the ambient temperature for 18 hours the volatile components were removed by evaporation under reduced pressure. The residue was treated with water (100 ml.) and extracted with chloroform (2 × 25 ml.) The extracts were combined, dried over anhydrous sulphate, and evaporated to yield a solid which was recrystallised from petroleum ether (boiling range 60°–80°C) to yield 3,5,5-trimethyl-2(N-ethylthiomethyl-N-methylcarbamoyl)oxyiminothiazolidin-4-one, having a melting point of 74°C.

EXAMPLE 19

This example illustrates the preparation of 3,5,5-trimethyl-2(N-methoxymethyl-N-methylcarbamoyl)oxyiminothiazolidin-4-one (Compound No. 35, Table I), having the formula:

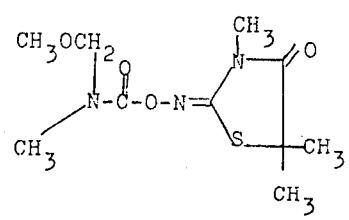

3,3,5-trimethyl-2(N-chloromethyl-N-methylcarbamoyl)oxyiminothiazolidin-4-one (2.0 g) was dissolved in methyl alcohol (50 ml.) warmed to 50°C for a few minutes and then kept at the ambient temperature for 18 hours. Upon cooling to 0°C a crystalline precipitate formed and this was collected by filtration and recrystallised from methanol to yield 3,3,5-trimethyl-2(N-methoxymethyl-N-methylcarbamoyl)oxyiminothiazolidin-4-one, melting at 116°C.

EXAMPLE 20

By a procedure similar to that illustrated in the previous example the preparation of another invention compound was effected using the appropriate reactants as follows:
3,5,5-trimethyl-2(N-ethoxymethyl-N-methylcarbamoyl)oxyiminothiazolidin-4-one (Compound No. 36, Table I) from 3,5,5-trimethyl-2(N-chloromethyl-N-methylcarbamoyl)oxyiminothiazolidin-4-one (Compound No. 22, Table I) and ethyl alcohol.

EXAMPLE 21

This example illustrates the preparation of 3,3,5-trimethyl-2-phenylcarbamoyloxyiminothiazolidin-4-one (Compound No. 18, Table I,) having the formula:

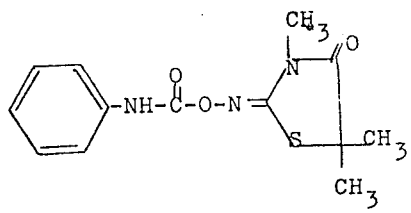

To a solution of 3,5,5-trimethyl-2-oximinothiazolidin-4-one (2.6 g) in chloroform (50 ml.) was added phenylisocyanate (1.8 g) and triethylamine (2 drops). The mixture was kept at the ambient temperature for 18 hours, after which the volatile components were removed by evaporation under reduced pressure and the residual solid recrystallized from diethyl ether to yield 3,5,5-trimethyl-2-phenylcarbamoyloxyiminothiazolidin-4-one, melting point at 98°C.

EXAMPLE 22

By a similar procedure to that illustrated in the preceeding example the following compounds were also prepared using the appropriate reactants as follows:
3-methyl-2-phenylcarbamoyloxyiminothiazolidin-4-one (Compound No. 28, Table I) from 3-methyl-2-oximinothiazolidin-4-one and phenyl isocyanate; and 3,5,5-trimethyl-2(3,4-dichlorophenyl)carbamoyloxyiminothiazolidin-4-one (Compound No. 37, Table I) from 3,5,5-trimethyl-2-oximinothiazolidin-4-one and 3,4-dichlorophenyl isocyanate.

EXAMPLE 23

This example illustrates the preparation of 3,5,5-trimethyl-2-carbamoyloxyiminothiazolidin-4-one (Compound No. 27, Table I) having the formula:

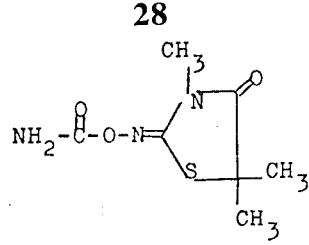

To a solution of 3,5,5-trimethyl-2-oximinothiazolidin-4-one (5.0 g) in chloroform (200 ml.) was added a solution of phosgene (3.0 g) in toluene (30 ml). After stirring for one hour at the ambient temperature, the mixture was cooled to 0°C and gaseous ammonia passed in for 15 minutes. The solvents were removed by evaporation under reduced pressure and the residual solid recrystallised from a mixture of toluene and petroleum ether (boiling range 60°–80°C) to yield a solid which did not melt, but sublimed at a temperature above 300°C.

EXAMPLE 24

This example illustrates the preparation of 5,5-dimethyl-2-(N-acetyl-N-methylcarbamoyl)oxyiminothiazolidin-4-one (Compound No. 14, Table I), having the formula:

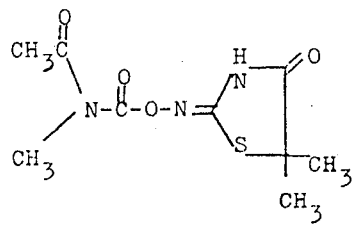

To a solution of 5,5-dimethyl-2-methylcarbamoyloxyiminothiazolidin-4-one (1.0 g) in pyridine (20.0 ml) acetyl chloride (2.0 ml.) was added slowly with external cooling to keep the reaction temperature below 5°C. When the addition had been completed the mixture was heated at 100°C for 15 minutes and then poured into iced water. The mixture was extracted with chloroform, the extracts washed with 5% w/v aqueous hydrochloric acid solution and with water, dried over anhydrous magnesium sulphate, and evaporated under reduced pressure to yield 5,5-dimethyl-2(N-acetyl-N-methylcarbamoyl)oxyiminothiazolidin-4-one, melting at 161°C.

EXAMPLE 25

This example illustrates the preparation of 3,5,5-trimethylthiazolidin-2,4-dithione having the formula:

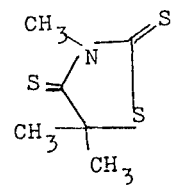

A mixture of 3,5,5-trimethylthiazolidin-2-one-4-thione (8.7 g), phosphorus pentasulphide (6.0 g) and dioxan (150 ml) was refluxed with stirring for 4 hours, after which the mixture was kept at the ambient temperature for 18 hours. The liquid was decanted, the solid residue washed with hot dioxan (2 × 25 ml) and the washings combined with the decanted liquid and heated with animal charcoal (5.0 g) and zinc dust (6.0 g) for 10 minutes. The mixture was filtered whilst hot, and the solvent evaporated under reduced pressure to yield a residual solid, which was recrystallised from ethanol to yield 3,5,5-trimethylthiazolidin-2,4-dithione, melting at 90°C.

EXAMPLE 26

This example illustrates the preparation of 3,5,5-trimethyl-4-oximino-thiazolidin-2-thione having the formula:

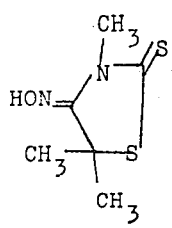

A mixture of 3,5,5-trimethylthiazolidin-2,4-dithione (6.0 g.), hydroxylamine hydrochloride (11.0 g.), pyridine (12.0 ml) and ethanol (150 ml.) and refluxed for eight hours. Ethanol was evaporated under reduced pressure and water (200 ml.) added to the residue. The mixture was extracted with chloroform (3 × 50 ml.), the combined chloroform extracts being washed with a 5% w/v solution of hydrochloric acid (3 × 100 ml.) and with water (100 ml.), dried over anhydrous magnesium sulphate, and evaporated under reduced pressure to yield a residual solid. This was recrystallised from petroleum ether (boiling range 80°–100°C) to yield 3,5,5-trimethyl-4-oximinothiazolidin-2-thione, having a melting point of 142°C.

EXAMPLE 27

This example illustrates the preparation of 3,5,5-trimethyl-2-n-butyl-iminothiazolidin-4-on 4 having formula:

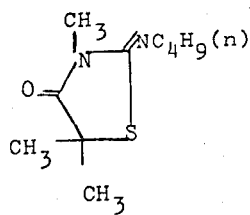

A mixture of 3,5,5-trimethylthiazolidin-4-one-2-thione (57.8 g) n-butylamine (25.0 g)) and ethanol (200 ml.) was refluxed for 8 hours, after which time the ethanol and excess n-butylamine were removed by evaporation under reduced pressure. The residual oil was distilled to yield 3,5,5-trimethyl-2-n-butyliminothiazolidin-4-one, boiling at 90°C/0.16 mm. Hg., having $n_D^{21}$ 1.5079.

EXAMPLE 28

This example illustrates the preparation of 3,5,5-trimethyl-2-n-butyliminothiazolidin-4-thione having the formula:

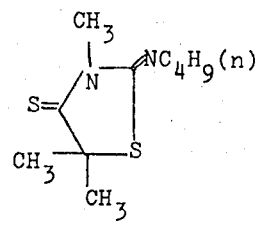

A mixture of 3,5,5-trimethyl-2-n-butyliminothiazolidin-4-one (42.8 g) phosphorus pentasulphide (17.8 g) and dioxan (200 ml.) was refluxed for eight hours with brisk stirring after which the liquid was decanted, heated with animal charcoal (2.0 g.) for 10 minutes, filtered whilst hot, and then evaporated under reduced pressure. The residual oil was distilled to yield 3,5,5-trimethyl-2-n-butyliminothiazolidin-4-thione, having a boiling point of 101°–102°C/0.22 mm.Hg.

EXAMPLE 29

This example illustrates the preparation of 3,5,5-trimethyl-2-n-butylimino-4-oximinothiazolidine having the formula:

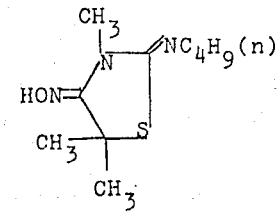

A mixture of 3,5,5-trimethyl-2-n-butyliminothiazolidin-4-thione (18.6 g) hydroxylamine hydrochloride (17.5 g) pyridine (18.2 ml.) and ethanol (150 ml) was refluxed until evolution of hydrogen sulphide had ceased (16 hours). The ethanol was removed by evaporation under reduced pressure and the pH of the residual mixture adjusted to 7 with concentrated hydrochloric acid. The mixture was then extracted with chloroform, the extracts dried over anhydrous magnesium sulphate, and evaporated to yield a residual oil, which on trituration with low boiling petroleum ether gave a solid. This was recrystallised from aqueous ethanol to yield 3,5,5-trimethyl-2-n-butylimino-4-oximinothiazolidine having a melting point of 137°C.

EXAMPLE 20

This example illustrates the preparation of 3,5,5-trimethyl-4-methyl-carbamoyloxyiminothiazolidin-2-thione (Compound No. 44, Table 3) having the formula:

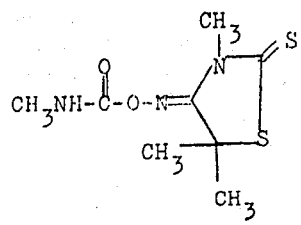

To a solution of 3,5,5-trimethyl-4-oximinothiazolidin-2-thione (5.7 g) in chloroform (100 ml.) was added methyl isocyanate (2.1 g) and triethylamine (3 drops).

The mixture was kept at the ambient temperature for 6 hours, after which the volatile components were removed by evaporation at reduced pressure, and the residual solid recrystallised from toluene to yield 3,5,5-trimethyl-4-methylcarbamoyloxyiminothiazolidin-2-thione, melting at 147°C.

EXAMPLE 31

This example illustrates the preparation of 3,5,5-trimethyl-2-n-butylimino-4-methylcarbamoyloxyiminothiazolidine (Compound No. 46, Table 3) having the formula:

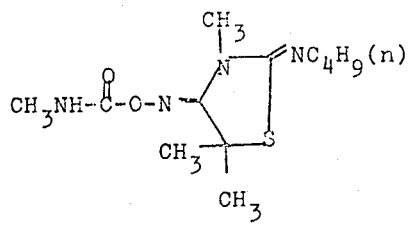

To a solution of 3,5,5-trimethyl-2-n-butylimino-4-oximinothiazolidine (2.6 g) in chloroform (50 ml.) was added methyl isocyanate (3.0 ml.) at the ambient temperature, and the mixture was kept at this temperature for 18 hours. Evaporation of the volatile portion under reduced pressure yielded a viscous oil which was identified by infra-red and n.m.r. spectroscopy as 3,5,5-trimethyl-2-n-butylimino-4-methylcarbamoyloxyiminothiazolidine.

EXAMPLE 32

This example illustrates the preparation of 3,5,5-trimethyl-4-dimethylcarbamoyloxyiminothiazolidin-2-thione (Compound No. 45, Table 1) having the formula:

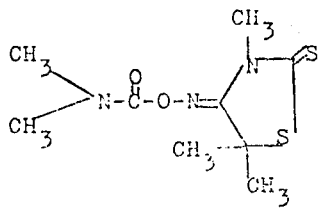

A mixture of 3,5,5-trimethyl-4-oximinothiazolidin-2-thione (2.6 g), chloroform (30 ml.), pyridine (10 ml.) and dimethylcarbamoyl chloride (2.0 ml.) was refluxed for 90 minutes, after which the volatile components were removed by evaporation under reduced pressure. The residue was treated with water, collected by filtration, and recrystallised from ethanol to yield 3,5,5-trimethyl-4-dimethylcarbamoyloxyiminothiazolidin-2-thione, melting at 218°C.

EXAMPLE 33

This example illustrates the preparation of the compound 3,5,5-trimethyl-2-methylcarbamoyloxyiminothiazolidin-4-one 1,1-dioxide (Compound No. 43, Table I) having the formula:

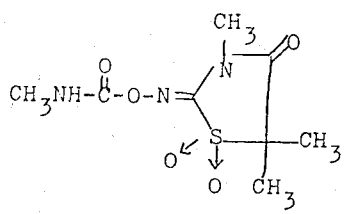

To a mixture of 3,5,5-trimethyl-2-methylcarbamoyloxyimino-thiazolidin-4-one (4.6 g) and glacial acetic (25.0 ml.) was added, at the ambient temperature, hydrogen peroxide solution (30 volume, 3.0 ml.) after which the mixture was kept at the ambient temperature for 72 hours. The volatile components were removed by evaporation under reduced pressure and the residue washed with petroleum ether (boiling range 40°-60°C) to yield 3,5,5-trimethyl-2-methylcarbamoyloxyiminothiazolidin-4-one 1,1-dioxide having a melting point of 118°C. The petroleum ether washings were evaporated to yield an oily mixture of 3,5,5-trimethyl-2-methylcarbamoyloxyiminothiazolidin-4-one 1-oxide with some of the dioxide.

EXAMPLE 34

This example illustrates the preparation of 2-oximino-3,5,5-trimethyloxazolidin-4-one having the formula:

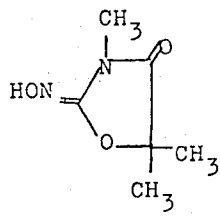

A mixture of 3,5,5-trimethyloxazolidin-4-one-2-thione (15.0 g) hydroxylamine hydrochloride (25.0 g) pyridine (27.0 g) and ethanol (200 ml.) was refluxed for four hours, after which the volatile portion was removed by evaporation under reduced pressure. The residual oil was poured into water (200 ml.) and the solid which precipitated out was collected by filtration, washed with water and dried to yield 2-oximino-3,5,5-trimethyloxazolidin-4-one, having a melting point of 246°C.

EXAMPLE 35

This example illustrates the preparation of 3,5,5-trimethyl-2-methylcarbamoyloxyiminooxazolidin-4-one (Compound No. 47) having the formula:

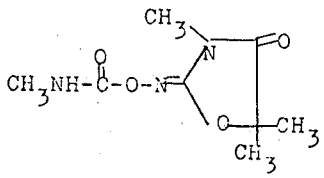

A mixture of 2-oximino-3,5,5-trimethyloxazolidin-4-one (5.9 g) chloroform (100 ml) and methyl isocyanate (2.2 g) was kept in a moisture free atmosphere at the ambient temperature for 18 hours. Evaporation of the volatile portion of the mixture under reduced pressure yielded 3,5,5-trimethyl-2-methylcarbamoyloxyimino-oxazolidin-4-one, Melting at 135°C.

EXAMPLE 36

The activity of a number of the compounds was tested against a variety of insect and other invertebrate pests. The compounds were used in the form of a liquid preparation containing 0.1% by weight of the compound except in the tests with *Aedes aegypti* where the preparations contained 0.01% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name "LISSAPOL" NX until the liquid preparations contained the required concentration of the compound. "Lissapol" is a Trade Mark.

The test procedure adopted with regard to each pests was basically the same and comprised supporting a number of the pests on a medium which was usually a host plant or a foodstuff on which the pests feed, and treating either or both the pests and the medium with the preparations.

The mortality of the pests was then assessed at pperiods usually varying from one to three days after the treatment.

The results of the tests are given below in Table 4. In this table the first column indicates the name of the pest species. Each of the subsequent columns indicates the host plant or medium on which it was supported, the number of days which were allowed to elapse after the treatment before assessing the mortality of the pests, and the results obtained for each of the compounds, numbered as in Tables 1 to 3. above. The assessment is expressed in integers which range from 0-3.

0 represents less than 30% kill
1 represents 30–49 percent kill
2 represents 50–90 percent kill
3 represents over 90 percent kill A dash (−) in Table 4 indicates that no test was carried out. The symbol 'A' indicates that an antifeeding effect was observed.

TABLE 4

| Pest Species | Support Medium | No. of days | 1 | 2 | 4 | 6 | 8 | 9 | 10 | 11 | 12 | 13 | 15 | 17 | 19 | 20 | 22 | 23 | 24 |
|---|---|---|---|---|---|---|---|---|---|---|---|---|---|---|---|---|---|---|---|
| *Tetranychus telarius* (red spider mites, adults) | French Bean | 3 | 0 | 0 | 3 | 3 | 0 | 2 | 3 | 3 | 3 | 3 | 0 | 0 | 0 | 2 | 3 | 3 | 1 |
| *Tetranychus telarius* (red spider mites, eggs) | French Bean | 3 | 0 | 0 | 0 | — | 1 | 0 | 0 | 0 | 3 | 0 | 0 | 2 | 0 | 0 | 3 | 0 | 2 |
| *Aphis fabae* (green aphids) | Broad Bean | 2 | — | 0 | 3 | 0 | 0 | 0 | 3 | 3 | 3 | 3 | 3 | 3 | 3 | 0 | 3 | 3 | 3 |
| *Megoura viceae* (black aphids) | Broad Bean | 2 | — | 0 | 3 | 0 | 0 | 0 | 3 | 3 | 3 | 3 | 0 | 3 | 3 | 0 | 3 | 3 | 3 |
| *Aedes aegypti* (mosquito larvae) | Water | 1 | 3 | 0 | 0 | — | 3 | 0 | 2 | 0 | 1 | 0 | 0 | 0 | 0 | 0 | 3 | 0 | 0 |
| *Aedes aegypti* (mosquito adults) | Plywood | 1 | 1 | 0 | 0 | 0 | 2 | 0 | 0 | 1 | 0 | 0 | 0 | 0 | 0 | 1 | 2 | 0 | 0 |
| *Musca domestica* (houseflies-contact test*) | Milk/Sugar | 2 | 2 | 2 | 0 | 1 | 0 | 3 | 0 | 0 | 2 | 0 | 2 | — | — | — | 2 | 1 | 0 |
| *Musca domestica* (houseflies-residual test*) | Plywood | 2 | 0 | 0 | 0 | 0 | 1 | 0 | 0 | 0 | 0 | — | 0 | — | — | — | 0 | 0 | 0 |
| *Blattella germanica* (cochroaches) | | 1 | — | — | — | — | 0 | 0 | 0 | 0 | 2 | 0 | 1 | 0 | 3 | 0 | 3 | 3 | 0 |

| | | | 1 | 2 | 4 | 5 | 7 | 9 | 10 | 11 | 12 | 15 | 17 | 18 | 19 | 20 | 21 | 22 | 23 |
|---|---|---|---|---|---|---|---|---|---|---|---|---|---|---|---|---|---|---|---|
| *Pieris brassicae* (cabbage white caterpillars - systemic test) | Cabbage | 2 | 3 A | 0 | 2 A | 3 A | 3 A | 3 A | 3 A | 2 | 0 | — | 3 A | 2 A | — | 0 | 3 A | 3 A | 0 A |
| *Pieris brassicae* (cabbage white caterpillars) (Contact test) | Cabbage | 2 | 0 | 0 | 3 A | 0 | 0 | 0 | 3 A | 3 A | 0 A | 0 | 3 A | 0 | — | 0 | 3 A | 3 A | 0 |
| *Plutella maculipennis* (diamond back moth, larvae - systemic test) | Mustard | 2 | 0 | 0 | 2 A | 0 | 0 | 0 | 2 A | 0 A | 0 A | — | 0 A | 0 | — | 0 | 0 | 0 A | 0 A |
| *Plutella maculipennis* (diamond back moth, larvae - contact test) | Mustard | 2 | — | — | — | 0 | 0 | 0 | 0 | 0 A | 0 A | 0 A | 0 | 0 | 0 | 0 | 0 | 0 A | 0 |
| *Phaedon cochleariae* (mustard beetles - residual test) | Mustard | 2 | 0 | 2 | 3 | 0 | 0 | 3 | 3 | 3 | 2 | 2 | 3 | 0 | 2 | 0 | 0 | 3 | 2 |
| *Phaedon cochleariae* (mustard beetles - systemic test) | Mustard | 2 | 3 A | — | — | 0 | — | — | — | 0 | 0 A | — | — | — | — | 0 | — | — | 0 |
| *Calandra granaria* (grain beetles) | Grain | 2 | — | 0 | 0 | 0 | 0 | 0 | 2 | 0 | 0 | 0 | 0 | 0 | 0 | 1 | 0 | 2 | 0 |
| *Tribolium confusum* (Flour beetles) | Grain | 2 | — | — | — | — | 0 | 0 | 0 | 0 | 0 | 0 | 0 | 0 | 0 | 0 | 0 | 2 | 0 |
| *Meloidogyne incognita* (nematodes) | Water | 1 | — | 0 | 0 | 0 | 2 | 0 | 3 | 0 | 0 | 0 | 0 | 0 | 3 | 3 | 3 | 0 | 0 |

| | | | 26 | 29 | 30 | 31 | 32 | 33 | 35 | 36 | 43 | 43A | 44 | 46 | 47 |
|---|---|---|---|---|---|---|---|---|---|---|---|---|---|---|---|
| *Tetranychus telarius* (red spider mites, adults) | French Bean | 3 | 0 | 0 | 0 | 0 | 3 | 3 | 0 | 0 | 0 | 0 | 1 | 0 | 2 |
| *Tetranychus telarius* (red spider mites, eggs) | French Bean | 3 | 0 | 0 | 0 | 0 | 2 | 0 | 0 | 0 | 0 | 0 | 0 | 0 | |
| *Aphis fabae* (green aphids) | Broad Bean | 2 | 0 | 0 | 0 | 0 | 3 | 3 | 3 | 0 | 0 | 0 | 3 | 0 | 3 |
| *Megoura viceae* | Broad Bean | 2 | 0 | 0 | 0 | 0 | 3 | 3 | 3 | 0 | 0 | 0 | 3 | 0 | 3 |

TABLE 4—Continued

| Pest Species | Support Medium | No. of days | COMPOUND NO: | | | | | | | | | | | |
|---|---|---|---|---|---|---|---|---|---|---|---|---|---|---|
| | | | 26 | 29 | 30 | 31 | 32 | 33 | 35 | 36 | 43 | 43A | 44 | 46 | 47 |
| (black aphids) *Aedes aegypti* (mosquito larvae) | Bean Water | 1 | 0 | 0 | 0 | 0 | 3 | 3 | 0 | 1 | 0 | 0 | 0 | 3 | 3 |
| *Aedes aegypti* (mosquitos adults) | Plywood | 1 | 0 | 2 | 0 | 2 | 0 | 0 | — | 0 | 0 | 0 | 0 | 0 | 2 |
| *Musca domestica* (houseflies-contact test*) | Milk/Sugar | 2 | 2 | 0 | 1 | 0 | 2 | 0 | 0 | 0 | 2 | 1 | 0 | 3 | — |
| *Musca domestica* (houseflies-residual test*) | Plywood | 2 | 0 | 0 | 0 | 0 | — | — | — | 0 | 0 | 0 | 0 | 0 | — |
| *Blattella germanica* (cochroaches) | | 1 | 0 | 0 | 0 | 0 | 3 | 3 | 2 | 0 | 0 | 0 | 0 | 0 | 3 |

| | | | 24 | 26 | 29 | 30 | 31 | 32 | 33 | 35 | 41 | 43 | 44 | 45 | 46 | 47 |
|---|---|---|---|---|---|---|---|---|---|---|---|---|---|---|---|---|
| *Pieris brassicae* (cabbage white caterpillars - systemic test) | Cabbage | 2 | 0 | — | 0 | 3A | 0 | 0 | 0 | 2 | — | 3 | 0 | 0 | 0 | 3 A A |
| *Pieris brassicae* (cabbage white caterpillars - contact test) | Cabbage | 2 | 2 A | 3 A | 3 | 0 A | 0 A | — | — | 2 | 2 | 0 | 0 | 0 | 3 A | 0 |
| *Plutella maculipennis* (diamond back moth, larvae - systemic test) | Mustard | 2 | 0 | — | 0 | 0 | 0 | 0 | 0 | 0 | — | 0 | 0 A | 0 | 3 A | 0 A |
| *Plutella maculipennis* (diamond back moth, larvae, contact test) | Mustard | 2 | 0 | 0 | 0 | 0 | 0 | 0 | 0 A | 0 | — | 0 | 0 | 0 | 2 A | 0 |
| *Phaedon cochleariae* (mustard beetles - residual test) | Mustard | 2 | 1 A | 0 A | 0 | 0 A | 0 A | 3 A | 3 A | 0 | — | 0 A | 0 | 0 A A | 1 A | 3 |
| *Phaedon cochleariae* (mustard beetles - systemic test) | Mustard | 2 | — | — | 0 | 0 | 0 | — | 3 A | 0 A | — | 0 | 0 A | 0 | 3 A | 3 A |
| *Calandra granaria* (grain beetles) | Grain | 2 | 0 | 0 | 0 | 0 | 2 | 0 | 0 | 0 | — | 0 | 0 | 0 | 0 | 1 |
| *Tribolium confusum* (flour beetles) | Grain | 2 | 0 | 0 | 0 | 0 | 0 | 2 | 0 | 0 | — | 0 | 0 | 0 | 0 | 2 |
| *Meloidogyne incognita* (nematodes) | Water | 1 | 0 | 0 | 0 | 3 | 0 | 3 | 0 | 0 | — | 0 | 3 | 2 | 3 | 2 |

*In the contact test the flies are sprayed directly; in the residual test the flies are placed on a medium that had previously been treated. In the systemic tests the preparations are applied to the soil in which the host plants are growing.

In the contact test the flies are sprayed directly; in the residual test the flies are placed on a medium that had previously been treated. In the synthetic tests the preparations are applied to the soil in which the host plants are growing.

EXAMPLE 37

Compounds of the invention were tested for molluscicidal activity and details of the tests conducted are as follows.

A weighed sample of the compound under test was dissolved in 0.5 cc of an ethanol and acetone mixture (50:50 v/v). The solution was diluted with 0.5 cc. water and poured on to a calf feeding pellet in a glass petri dish and the pellet was air dried for 24 hours. The weight of compound used was chosen so that the dried pellet contained 4% by weight of the active ingredient. Two replicates each consisting of a plastic petri dish containing a pellet, 2 slugs, and a moistened filter paper to maintain a high relative humidity were used in each test. The dishes were left in the cold room (10°C). After 6 days the kill was assessed.

The slugs used were *Agriolimax reticulatus* (Mull), and they had been starved for 24 hours before the commencement of the tests. The results of the test are set out in Table 5 below.

TABLE 5

| Compound No. | % kill | Compound No: | % kill |
|---|---|---|---|
| 1 | 50 | 20 | 100 |
| 7 | 100 | 21 | 50 |
| 9 | 100 | 22 | 100 |

TABLE 5—Continued

| | | | |
|---|---|---|---|
| 10 | 100 | 23 | 100 |
| 12 | 50 | 26 | 100 |
| 15 | 100 | 32 | 100 |
| 16 | 100 | 33 | 50 |
| 17 | 50 | 35 | 100 |
| 19 | 50 | 47 | 100 |

EXAMPLE 38

The compounds of this invention were tested against a variety of foliar fungal diseases of plants. The technique employed is to spray the foliage of the undiseased plants with a solution of the test compound and also to drench the soil in which the plants are growing with another solution of the same test compound. All solutions for spraying and drenching contained 0.01% of the test compound. The plants were then infected with the diseases it was desired to control and after a period of days, depending upon the particular disease, the extent of the disease was visually assessed. The results are given in Table 6A below, wherein the extent of the disease is given in the form of a grading as follows:

| Grading | Percentage Amount of Disease |
|---|---|
| 0 | 61 to 100 |
| 1 | 26 to 60 |
| 2 | 6 to 25 |
| 3 | 0 to 5 |

In Table 6 the disease is given in the first column, and in the second column is given the time which elapsed between infecting the plants and assessing the amount of disease.

TABLE 6

| Disease and Plant | Time interval Days | Disease Code Letter (Table 6A) |
|---|---|---|
| Puccinia recondita (Wheat) | 7 | A |
| Phytophthora infestans (tomato) | 3 | B |
| Plasmopara viticola (vine) | 7 | C |
| Uncinula necator (vine) | 10 | D |
| Piricularia oryzae (rice) | 7 | E |
| Podosphaera leucotricha (apple) | 10 | F |
| Botrytis cinerea (vine) | 3 | G |

TABLE 6A

| Compound No: | A | B | C | D | E | F | G |
|---|---|---|---|---|---|---|---|
| 2 | 2 | 1 | 0 | 3 | 0 | 3 | 0 |
| 4 | 2 | 3 | 1 | 0 | 0 | 0 | 0 |
| 6 | 0 | — | 0 | — | 0 | 3 | 0 |
| 9 | 3 | 1 | 2 | 3 | 0 | 1 | 0 |
| 15 | 0 | 1 | 3 | 3 | 0 | 0 | 0 |
| 16 | 0 | 1 | 3 | 0 | 0 | 0 | 0 |
| 17 | 3 | 3 | 3 | 3 | 0 | 0 | 0 |
| 18 | 0 | 0 | 0 | 0 | 0 | 0 | 2 |
| 20 | 0 | 3 | 0 | 3 | 1 | 2 | 0 |
| 21 | 0 | 2 | 3 | 0 | 0 | 0 | 0 |
| 22 | 1 | 3 | 0 | 0 | 0 | 1 | 0 |
| 24 | 0 | 3 | 0 | 3 | 1 | 2 | 0 |
| 26 | 0 | 3 | 0 | 0 | 1 | 0 | 1 |
| 29 | 0 | 1 | 3 | 0 | 0 | 0 | 0 |
| 30 | 0 | 3 | 0 | 1 | 0 | 0 | 0 |
| 31 | 0 | 0 | 0 | 0 | 0 | 2 | 0 |
| 32 | 0 | 3 | 0 | 1 | 0 | 1 | 0 |
| 33 | 1 | 3 | 0 | 1 | 0 | 1 | 3 |
| 34 | 1 | 1 | 0 | 0 | 1 | — | 1 |
| 35 | 2 | — | — | 1 | 0 | 0 | 0 |
| 43 | 1 | 2 | 0 | 0 | 0 | 3 | 0 |
| 44 | 0 | 4 | 3 | 3 | 1 | 0 | 1 |
| 45 | 0 | 3 | 0 | 1 | 0 | 0 | 0 |

EXAMPLE 39

This example illustrates a dusting powder which may be applied directly to plants or other surfaces and comprises 1% by weight of compound No. 4 of Table I and 99% by weight of talc.

EXAMPLE 40

25 Parts by weight of Compound No. 4 of Table I, 65 parts by weight of xylene, and 10 parts of an alkyl aryl polyether alcohol ('Triton' X-100; 'Triton' is a Trade Mark) were mixed in a suitable mixer. There was thus obtained an emulsion concentrate which can be mixed with water to produce an emulsion suitable for use in agricultural applications.

EXAMPLE 41

5 Parts by weight of Compound No. 4 of Table I were thoroughly mixed in a suitable mixer with 95 Parts by weight of talc. There was thus obtained a dusting powder.

EXAMPLE 42

10 Parts by weight of compound No. 4 of Table I, 10 parts of an ethylene oxide-octylphenol condensate ("Lissapol" NX; "Lissapol" is a Trade Mark) and 80 parts by weight of diacetone alcohol were thoroughly mixed. There was thus obtained a concentrate which, in mixing with water, gave an aqueous dispersion suitable for application as a spray in the control of insect pests.

EXAMPLE 43

This example illustrates a concentrated liquid formulation in the form of an emulsion. The ingredients listed below were mixed together in the stated proportions and the whole stirred until the constituents were dispersed.

|  | % wt. |
|---|---|
| Compound No. 4 of Table I | 20 |
| 'LUBROL' L ('Lubrol' is a Trade Mark) | 17 |
| Calcium dodecylbenzenesulphonate | 3 |
| Ethylene dichloride | 45 |
| 'AROMASOL' H ('Aromasol' is a Trade Mark) | 15 |
|  | 100% |

EXAMPLE 44

The ingredients listed below were ground together in the proportions stated to produce a powdered mixture readily dispersible in liquids.

|  | % wt. |
|---|---|
| Compound No. 10 of Table I | 50 |
| Dispersol T ("Dispersol" is a Trade Mark) | 5 |
| China Clay | 45 |
|  | 100% |

EXAMPLE 45

A composition in the form of grains readily dispersible in a liquid (for example water) was prepared by grinding together the first four of the ingredients listed below in the presence of water and then the sodium acetate was mixed in.
The admixture was dried and passed through a British Standard mesh sieve, size 44-100 to obtain the desired size of grains.

|  | % wt. |
|---|---|
| Compound No. 11 of Table I | 50 |
| Dispersol T | 12.5 |
| Calcium lignosulphonate | 5 |
| Sodium dodecylbenzenesulphonate | 12.5 |
| Sodium acetate | 20 |

EXAMPLE 46

A composition suitable for use as a seed dressing was prepared by mixing all three of the ingredients set out below in the proportions stated.

|  | % wt. |
|---|---|
| Compound No. 12 of Table I | 80 |
| Mineral Oil | 2 |
| China Clay | 18 |
|  | 100% |

EXAMPLE 47

A granular composition was prepared by dissolving the active ingredient in a solvent, spraying the solution obtained on to the granules of pumice and allowing the solvent to evaporate.

|  | % wt. |
|---|---|
| Compound No.22 of Table I | 5 |
| Pumice Granules | 95 |
|  | 100% |

EXAMPLE 48

An aqueous dispersion formulation was prepared by mixing and grinding the ingredients recited below in the proportions stated.

|  | % wt. |
|---|---|
| Compound No. 47 of Table I | 40 |
| Calcium lignosulphonate | 10 |
| Water | 50 |
|  | 100% |

The following constitutes an explanation of the compositions or substances represented by the various Trade Marks and Trade Names referred to in the foregoing Examples.

| | |
|---|---|
| 'LUBROL'L | is a condensate of 1 mole of nonyl phenol with 13 molar proportions of ethylene oxide. |
| 'AROMASOL'H | is a solvent mixture of alkylbenzenes |
| 'DISPERSOL' T | is a mixture of sodium sulphate and a condensate of formaldehyde with the sodium salt of naphthalene sulphonic acid. |
| 'LISSAPOL' NX | is a condensate of 1 mole of nonyl phenol with 8 moles of ethylene oxide. |
| 'TRITON' X-100 | is an alkyl aryl polyether alcohol. |

I claim:

1. An insecticidal composition comprising, as active ingredient, an insecticidally effective amount of a compound of the formula:

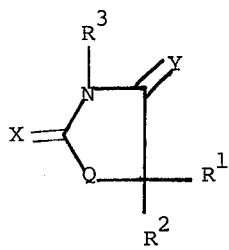

wherein Q is oxygen, sulphur, sulphoxide or sulphone; $R^1$ and $R^2$ which may be the same or different are hydrogen or alkyl containing up to four carbon atoms; $R^3$ is hydrogen, alkyl containing up to eight carbon atoms, allyl, benzyl, dimethylamino, methyl-thiomethyl, ethoxycarbonylmethyl, or halo-substituted pyridyl; and either (i) X is a group of the formula:

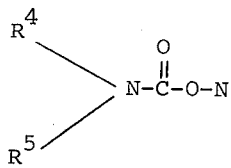

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and Y is oxygen, sulphur or alkylimino containing up to four carbon atoms; or (ii) Y is a group of the formula:

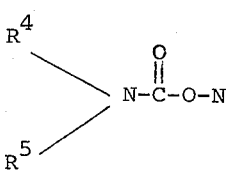

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and X is oxygen, sulphur or alkylimino containing up to four carbon atoms, and a pesticidal carrier.

2. The composition of claim 1 wherein the compound is

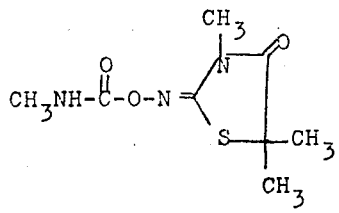

3. A method of combating "insects which comprises applying to said insects or their habitat thereof an insecticidally" effective amount of a compound of the formula:

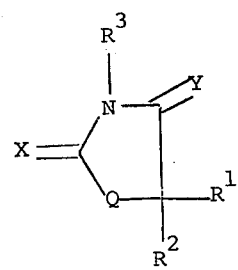

wherein Q is oxygen, sulphur, sulphoxide or sulphone; $R^1$ and $R^2$ which may be the same or different are hydrogen or alkyl containing up to four carbon atoms; $R^3$ is hydrogen, alkyl containing up to eight carbon atoms, allyl, benzyl, dimethylamino, methyl-thiomethyl, ethoxycarbonylmethyl, or halo-substituted pyridyl; and either (i) X is a group of the formula:

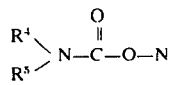

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and Y is oxygen, sulphur or alkylimino containing up to four carbon atoms; or (ii) Y is a group of the formula:

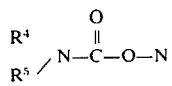

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and X is oxygen, sulphur or alkylimino containing up to four carbon atoms.

4. The method of claim 3 wherein the compound is

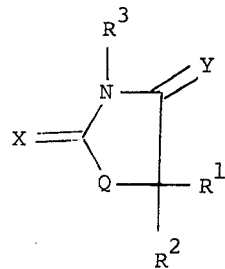

5. A method of "combatting insects on plants which comprises applying to said plants an insecticidally effective amount of" a compound of the formula:

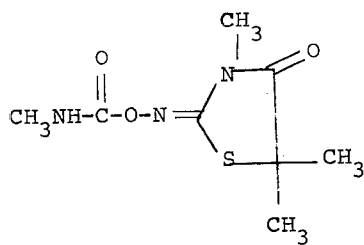

wherein Q is oxygen, sulphur, sulphoxide or sulphone; $R^1$ and $R^2$ which may be the same or different are hydrogen or alkyl containing up to four carbon atoms; $R^3$ is hydrogen, alkyl containing up to eight carbon atoms, allyl, benzyl, dimethylamino, methyl-thiomethyl, ethoxycarbonylmethyl, or halo-substituted pyridyl; and either (i) X is a group of the formula:

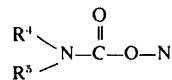

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and Y is oxygen, sulphur or alkylimino containing up to four carbon atoms; or (ii) Y is a group of the formula:

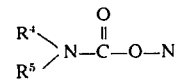

where $R^4$ and $R^5$, which may be the same or different, are hydrogen, alkyl containing up to four carbon atoms, phenyl, chlorosubstituted phenyl, acetyl, chloromethyl, methoxymethyl, ethoxymethyl or ethylthiomethyl; and X is oxygen, sulphur or alkylimino containing up to four carbon atoms.

6. The method of claim 5 wherein the compound is

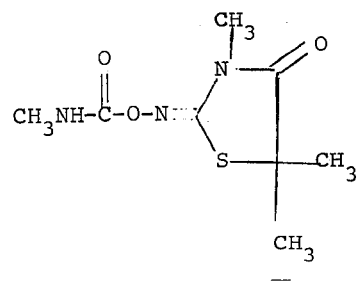

* * * * *